United States Patent [19]

Howells et al.

[11] Patent Number: 4,893,197

[45] Date of Patent: Jan. 9, 1990

[54] PAUSE COMPRESSION AND RECONSTITUTION FOR RECORDING/PLAYBACK APPARATUS

[75] Inventors: Joseph A. Howells, Brookfield; Alan F. Sweet, Stratford, both of Conn.

[73] Assignee: Dictaphone Corporation, Stratford, Conn.

[21] Appl. No.: 291,842

[22] Filed: Dec. 29, 1988

[51] Int. Cl.[4] .......................... G11B 5/00; G11B 5/02
[52] U.S. Cl. ............................................ 360/8; 360/27
[58] Field of Search ............................... 360/27, 71, 8

[56] References Cited

U.S. PATENT DOCUMENTS 3,723,667  3/1973  Park, Jr. et al. ........................ 360/8
3,763,328  10/1973  Lester et al. ............................ 360/8
4,130,739  12/1978  Patten ..................................... 360/8
4,750,053  6/1988  Allen ....................................... 360/8

Primary Examiner—Vincent P. Canney
Attorney, Agent, or Firm—Robert H. Whisker; Melvin J. Scolnick; David E. Pitchenik

[57] ABSTRACT

Pauses present in an input audio signal are detected and digitally encoded to represent the length of each pause. The audio signals are recorded; but the pauses included therein are replaced by respective pause encoded signals, thereby compressing the audio signals. When the compressed audio signals are played back, each pause encoded signal is sensed and is replaced by a pause whose length is derived from the encoded signal.

29 Claims, 4 Drawing Sheets

PAUSE COMPRESSION AND RECONSTITUTION FOR RECORDING/PLAYBACK APPARATUS

BACKGROUND OF THE INVENTION

This invention relates to audio recording/reproducing apparatus and, more particularly, to such apparatus wherein redundant information, namely, pauses, included in audio signals are removed, thereby eliminating the need to record non-informational signals; but such redundant information is re-inserted during a playback operation.

In typical prior art dictation systems, audio information is recorded on a magnetic medium, typically magnetic tape, wherein virtually all of the sounds and pauses uttered by a dictator are recorded and subsequently played back. Typical of such dictation equipment are analog recorders wherein the audio information is recorded in analog form. Customarily, analog dictation systems have been classified as stand alone units, also known as desk-top or portable recorders in which the magnetic tape is housed in a replaceable tape cassette, central systems wherein one or more bins of endless tape are accessible to several dictators and to several transcriptionists, whereby multiple dictate and transcribe operations may be performed simultaneously, central systems wherein individual tape decks are used in place of the aforementioned tape bins, and so-called small work group systems which combine the advantages of both central and stand alone dictation systems. Each of the aforementioned types of equipment has been made available by Dictaphone Corporation, the assignee of the present invention, and descriptions of typical apparatus are found in the following patent literature:

Stand alone machines are described in U.S. Pat. Nos. 4,378,577 and 4,410,923.

Central systems using endless magnetic tape as the recording medium are described in U.S. Pat. Nos. 3,817,436 and 3,984,644.

Central systems using replaceable tape cassettes are described in U.S. Pat. Nos. 4,092,679 and 4,636,888.

Small work group systems are described in U.S. Ser. No. 145,228, filed Jan. 19, 1988 and U.S. Ser. No. 799,909, now U.S. Pat. No. 4,722,077 filed Nov. 20, 1985.

Recently, digital recording techniques have been proposed for use in dictation equipment. Although digital controls have long been used in controlling and monitoring dictation and transcription operations, such as described in U.S. Pat. Nos. 4,319,337 and 4,623,988, the audio information recorded in such digitally controlled equipment nevertheless has been recorded in analog form. However, with the recent development of low cost, high capacity digital storage equipment, such as high capacity floppy disks and, more advantageously, high capacity hard disk storage systems (also known as Winchester disk drives, rigid disk drives, disk packs, etc.), the opportunity to economically record audio information in digital form has been made available.

In digital dictation equipment, input analog audio signals are sampled and each analog sample is converted to a digital audio sample. Bytes representing the digital audio samples are recorded on a magnetic disk, either a floppy disk or a Winchester disk, in much the same way as any other digital information is magnetically stored (or "written"). During playback (or "reading"), each byte is read from the magnetic disk and converted to an analog sample. Successive samples result in a restoration of the original analog audio signal. The high speeds at which digital signals are processed, recorded, read and manipulated when compared to the relatively low frequencies of typical speech signals, permit a relatively inexpensive digital storage device to be used as the primary store of a central dictation system. By using a single (or relatively few) high capacity Winchester disk drive, several dictators and several transcriptionists may access the central store to record and transcribe messages. Also, digital recording techniques permit quick access, on the order of milliseconds, to virtually any message that has been recorded, thereby facilitating quick review, recovery and editing of respective messages. Indeed, contrary to typical analog dictation systems, a digital system permits a dictator to edit a message in such a way that, during transcription of that edited message, the transcriptionist need not even be aware of the fact that editing has been achieved. This contrasts with conventional analog dictation systems wherein editing typically is achieved by recording special instructions to direct a transcriptionist to other parts of the magnetic tape on which inserts or other changes are recorded.

One drawback in audio recording systems has been the need heretofore to record redundant, or non-informative, signals. In a typical audio message, several pauses are present between syllables, words and phrases. Some of these pauses are inherent in typical speech patterns, and others merely are a function of the dictator's need to collect his thoughts while recording a message. In any event, when such pauses are recorded, they occupy useful space on the recording medium which could otherwise be occupied by intelligible sounds.

There have been attempts heretofore to minimize the recording of pauses on the record medium by using so-called voice operated equipment (VOX) whereby a recording operation commences at the first utterance of audible sound, but that operation is interrupted when a predetermined amount of silence, or a pause, is detected. While such VOX recorders generally have been successful in analog dictation systems, they still result in the recording of significant amounts of redundant information in digital dictation systems. It is desirable to eliminate pauses in audio signals to a much greater extent than has been achieved by conventional VOX systems. It also is desirable to provide flexibility in re-inserting pauses when audio signals which had been compressed as a result of pause removal are played back.

Although digital recording/playback systems provide a desirable quality of high fidelity, if audio signals are recorded in compressed form (as by removing pauses therein), the reinsertion of such pauses, even if of a selectively variable length, nevertheless results in high fidelity "dead silence". Upon hearing such "dead silent" pauses, a transcriptionist may believe that the transcription equipment is not operating properly. It is further desirable to minimize such erroneous suspicions of equipment malfunction; and this is achieved by the invention disclosed herein.

OBJECTIONS OF THE INVENTION

Therefore, it is an object of the present invention to provide improved sound recording and reproducing apparatus which avoids the aforenoted drawbacks and disadvantages.

Another object of this invention is to provide sound recording and reproducing apparatus in which redundant information, namely pauses, are not recorded but, nevertheless, upon playing back audio signals which had been compressed by the removal of pauses therein, such pauses are recovered.

A further object of this invention is to provide digital recording and reproducing apparatus in which pauses in input audio signals are removed and, thus, not recorded, but a pause of selectable length is inserted into those audio signals during a reproduction operation.

An additional object of this invention is to provide sound recording and reproducing apparatus in which input audio signals are recorded in compressed form by removing the pauses therein, but such compressed signals are expanded during a playback operation by inserting random, or white, noise at those locations in which pauses had originated.

Various other objects, advantages and features of the present invention will become readily apparent from the ensuing detailed description, and the novel features will be particularly pointed out in the appended claims.

SUMMARY OF THE INVENTION

In accordance with this invention, sound recording and reproducing apparatus are provided wherein audio signals are recorded in compressed form by removing pauses included in the original signals. A pause encoded signal representing the length of each pause is substituted for the pause itself; and the pause encoded signal is recorded. As one feature of this invention, the audio signals are recorded in digital form, and the pause encoded signal is in digital format to identify the length and location of a pause.

As one aspect of this feature of the invention, pauses in the input audio signal are detected by comparing the audio signal to a threshold value and measuring the duration that the audio signal level falls below that value. Advantageously, the threshold value is selectable, thereby providing a sensitivity adjustment to the technique of pause detection.

As another aspect, digital samples of the audio signal are stored in a temporary addressable storage device; and those addresses which would otherwise be occupied by pause samples are used to provide address markers that are included in the digital pause encoded signal to represent the beginning and end of each pause. Once the pause-occupied addresses are determined, the storage locations in which the digital audio samples are stored are established to eliminate wasted storage space.

As another feature of this invention, during a playback operation, the pause length and location represented by each digital pause encoded signal is used to insert into the played back audio signal a pause whose length is derived from the digital pause encoded signal.

As a further feature of this invention, a random noise generator is controlled by the pause encoded signal to produce random noise during an interval substantially equal to the length of the inserted pause. This random noise is inserted into the audio signal, thereby producing a "noisy" pause.

As yet another feature of this invention, the length of the inserted pause is variable and is set equal to a predetermined amount if the length of the actual, original pause exceeds a threshold length, but is set equal to the original length if that original length is less than the threshold. As an aspect of this feature, a selector is provided to enable an operator to set the length of the inserted pause to any desired amount. Thus, during playback, the inserted pause may be less than or greater than the original pause length, as selected by the operator.

In accordance with another aspect of this invention, during playback the digital audio signals and pause encoded signals are temporarily stored and then read out and converted to analog form. When a pause encoded signal is sensed, further read out of the temporary storage device is inhibited for a duration substantially equal to the length represented by the pause encoded signal. Consequently, a pause is reinserted into the played back audio signals; and the length of the inserted pause is selectable, as mentioned above.

BRIEF DESCRIPTION OF THE DRAWINGS

The following detailed description, given by way of example, will best be understood in conjunction with the accompanying drawings in which.

DETAILED DESCRIPTION OF A PREFERRED EMBODIMENT

The invention disclosed herein is described in the environment of dictation/transcription equipment, and particularly in the environment of such equipment wherein plural dictation operations may be carried out concurrently with a transcription operation. However, it will be fully appreciated that this invention admits of more general application in the sound recording arts and need not be limited solely to such dictation/transcription equipment.

DICTATE/TRANSCRIBE SYSTEM

Figure 1:
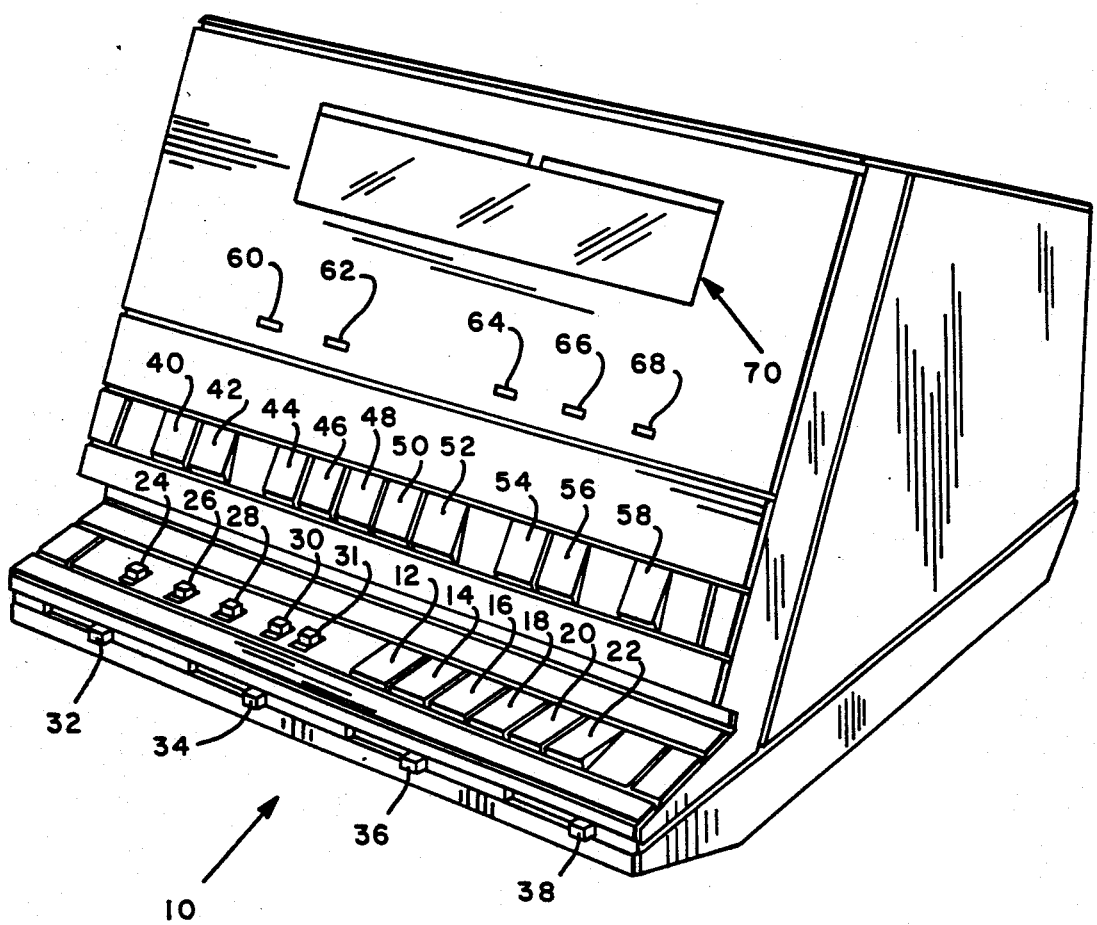
FIG. 1 is a perspective view of a preferred embodiment of recording and reproducing apparatus which incorporates the present invention.

Turning now to FIG. 1, there is illustrated a perspective view of dictation/transcription equipment 10 in which the present invention is used. This equipment is referred to herein as a recording/reproducing system and it will be appreciated that various peripheral devices, such as dictate stations may be easily connected to system 10. In the interest of simplification and brevity, such peripheral devices are not shown. Examples of suitable dictate and transcribe stations are described in U.S. Serial No. 495,756 now U.S. Pat. No. 4,658,097, Ser. Nos. 145,228 and 799,909 now U.S. Pat. No. 4,722,077. System 10 includes a suitable microprocessor, such as Model MPD 70208, manufactured by NEC, for controlling the communication of information and function control signals between the system and the dictate and transcribe terminals connected thereto. In addition, data concerning the length of each dictated message, referred to herein as a "job", the source of that message, the time at which it was dictated, the identity of the transcriptionist selected to transcribe it, the time at which transcription was completed and other, similar information are generated, monitored and displayed by the microprocessor. It will be appreciated that such job related information is useful for management purposes, such as determining backlog, efficiency, etc. in a dictate/transcribe operation.

The manner in which the microprocessor operates to monitor dictation/transcription traffic through system 10, and the manner in which the aforementioned management information is generated and used, forms no part of the present invention per se. Nevertheless, to provide an understanding of the overall operation of system 10, the following control functions are described:

System 10 is provided with various manually operable pushbutton selector switches 12–58 which are used in conjunction with dictation and transcription as follows: Button 12 operates as a STOP switch which, when actuated, terminates whatever transcription function then is in process. In the preferred embodiment of system 10, input audio signals received from a dictate station are converted to digital form and these digital audio signals are stored, preferably on a magnetic medium. Although floppy disk media may be used to record such digital audio signals, the use of a Winchester disk drive is contemplated. A so-called "pointer" is generated and used to identify the locations in the storage medium, that is, on the disk medium, at which the digital audio signals are recorded. As dictation proceeds, this pointer advances. If a dictator reviews those audio signals which he had recorded, the pointer is reversed. Thus, it will be appreciated that this pointer functions in much the same way as a magnetic tape to the extent that both the tape and pointer are advanced during recording or reproducing operations, both the tape and pointer are reversed to effect a "rewind" operation, and both the tape and pointer are advanced at a relatively rapid rate to effect a "fast forward" operation.

Similarly, a pointer is generated and used to identify the locations on the disk medium from which the digital audio signals are played back, or transcribed. Here too, this transcribe pointer advances and reverses while play, fast forward and review operations are selected by the transcriptionist. It is appreciated that the transcribe pointer is "stopped" in much the same way as a magnetic tape is stopped in response to the actuation of STOP button 12.

A REVIEW button 14 is provided to reverse the pointer, as aforementioned, in a manner similar to a magnetic tape rewind operation. Hence, actuation of the REVIEW switch emulates the rewind movement in a conventional analog dictation system.

A FAST FORWARD button 16 is provided to effect rapid advance of the aforementioned pointer in a manner similar to the fast forward movement of a conventional analog dictation system. In one embodiment, the "rate" at which the pointer is advanced increases with the length of time that FAST FORWARD switch 16 remains actuated. Preferably, if the pointer had been reversed from the farthest advance "position" attained thereby, the "fast forward" advance of the pointer terminates once the pointer returns to its farthest advance "position".

Pushbutton switch 18 functions as a BORDER switch which, when actuated, positions the pointer almost instantly at the beginning of the message then being dictated or transcribed. If switch 18 is actuated a second time, the pointer is moved practically instantly to the end of that message. Thus, the user may access the beginning or end of a message without waiting for the simulated "rewind" or "fast forward" operation. This feature is particularly helpful to a transcriptionist.

A PLAY pushbutton switch 20 is provided to initiate the playing back of recorded audio signals. When a transcriptionist accesses a particular job that had been recorded, the actuation of PLAY switch 20 begins the playback operation of that job. Of course, it is expected that a transcriptionist or dictator, or a supervisor, also will operate the PLAY switch to resume the interrupted play back of a recorded message.

Pushbutton switch 22 operates as a RESUME switch which, when actuated, moves the aforementioned pointer to the farthest advance position which had been attained in the message which then is being transcribed. For example, if the transcriptionist wishes to review a mid-portion of a job, once that portion has been verified, the transcriptionist may return to the farthest advance point at which she had left off merely by actuating RESUME switch 22.

A selector switch 24 is provided to enable the user of system 10 to listen to reproduced audio information either by way of the built-in speaker (not shown) included in the system or by way of a headset (also not shown) which may be connected to the system.

Selector switch 26 is adapted to enable system 10 to be connected to a transcribe station either by way of a "hard wire" connection, also known as a "private line" connection, or by way of a telephone connection. Thus, the transcribe station may be connected directly to system 10 via private lines or via a conventional telephone network. An example of such local/remote connection of a transcribe station to an audio signal playback device is described in U.S. Ser. No. 495,756.

In one embodiment of system 10, two dictate stations and one transcribe station are adapted to be connected to respective ports of the system. The transcribe port, that is, the port to which the transcribe station is connected, is adapted to exhibit three different operating modes, any one of which may be selected by selector switch 28. A so-called "normal" mode connects the transcribe station through the transcribe port to carry out a typical transcribe operation. A re-record mode may be selected to enable audio signals recorded in system 10 to be played back through the transcribe port and re-recorded on another medium. Stated otherwise, previously dictated jobs may be "downloaded" through the transcribe port onto, for example, a tape cassette, whereby that job may be transcribed on a separate stand-alone transcribe machine. Finally, a so-called "off-line" mode may be selected, whereby the transcribe port is rendered out of service. In this mode, previously recorded jobs cannot be transcribed or re-recorded through the transcribe port.

A two-position selector switch 30 is provided and exhibits a "normal" position which enables dictation and transcription to occur. In its other position, switch 30 enables the user to enter into a suitable storage table the identification of those individuals who are expected to record and/or transcribe messages on system 10. In this so-called "entry" position of switch 30, the identification, such as ID numbers of dictators (or "authors") may be entered. During subsequent dictation operations, a dictator whose identification has been entered into system 10 thus may be identified as the author of a dictated job. This facilitates management over the dictation operation, such as by enabling those jobs recorded by a particular dictator to be recovered, processed, or monitored.

- A three-position selector switch 31 is adapted to permit an operator to vary the type of operation that may be carried out via the transcribe port. In one position, referred to as the "transcribe" position, the transcribe port is conditioned to effect typical transcribe operations. For example, when conditioned for a transcribe operation, previously recorded digital audio signals may be played back and reproduced via a headset or loudspeaker under the control of a foot pedal switch. In another position, referred to as the "dictate once" position, the transcribe port is conditioned to effect a "one time" dictate operation, whereby a dictator may record one or more messages on the disk medium by way of a connection between the dictator's dictate station and the transcribe port. Typical dictate functions are carried out; but once seizure of the transcribe port by the dictate station ends, for example, once the dictator hangs up, the transcribe port reverts to its aforementioned transcribe condition and now may be used for transcribe operations. Finally, in the third position of switch 31, referred to as the "dictate" position, the transcribe port is conditioned for continuous dictate operations (as opposed to the aforedescribed "dictate once" operation), whereby a dictate station may seize the transcribe port to carry out a typical dictate operation. The transcribe port remains in its dictate condition even after the dictator hangs up, thus permitting further seizures of the transcribe port for still additional dictate operations by the same or different dictators.

A volume control 32, such as in the form of a slide control, is provided to increase or decrease the audio volume of a message played back from system 10. Similarly, a tone control 34, also constructed as a slide control, permits the user to adjust the treble/bass balance of the reproduced audio signal.

A speed control 36 is provided as a slide control and is adapted, when adjusted, to enable the transcriptionist to vary the speed at which reproduced signals are played back. Thus, if the transcriptionist is not comfortable with the normal speed pattern of a dictator, speed control 36 may be adjusted to modify at least the speed of that pattern. As one example of speed control, pauses in the reproduced audio signals are compressed or expanded to vary the speed of the played back speech pattern. An automatic backspace control 38, which also is constructed as a slide control, is adapted to establish the amount of backspacing automatically achieved when a transcriptionist momentarily interrupts the playback operation. For example, upon release of a suitable switch, such as a foot pedal or the like, during a transcribe operation, the aforementioned pointer returns to a previous location. The magnitude of this return is the "backspace" and it may be adjusted by manually adjusting control 38. In the preferred embodiment, this backspace control is adjustable over a range from zero to ten seconds.

System 10 is provided with a display window 70 adapted to display various text messages relating to the jobs which have been dictated and/or transcribed in system 10. In the preferred embodiment, display window 70 is comprised of a multi-line dot matrix LCD display. Typical of the information displayed are: current date and time, total number of untranscribed jobs recorded on system 10, total dictation time of those untranscribed jobs, the number of jobs of a selected type (e.g. the number of letters or the number of memos or the number of reports, etc.) that have not been transcribed, and the number of jobs dictated by a particular author which remains untranscribed. Display window 70 also provides information relating to the job which has been selected by the transcriptionist for transcription. Information relating to this selected, or current job, includes the identification of the author and type of that job, the date the job was commenced, the time at which dictation of the job was completed, the overall length of that job, and the time remaining from the present position to the end of that job (this assumes that at least a portion of the job already has been transcribed).

Pushbutton 40–58 are used to select and control some of the information displayed by display window 70. A set pushbutton 40 and a select pushbutton 42 are used to set the current date and time displayed by display window 70. A work type pushbutton 46 is adapted, when actuated, to select a desired one of several predetermined (or pre-programmed) work types, or categories of jobs which may be recorded on system 10. By actuating pushbutton 46, the work type display is scrolled, thus enabling the user to select a particular type of job for transcription or for display.

An author pushbutton switch 48 is adapted, when actuated, to enable the user to scroll through those identifications which have been entered into system 10, as was described above in conjunction with the operation of switch 30 to its "entry" position. The user thus may observe those authors authorized for access to system 10. By operating switch 30, the user may select a desired author whose jobs are to be transcribed; or the user may at least be apprised of those jobs which this author has dictated.

Pushbutton switches 50 and 52 are adapted, when actuated, to scroll in the reverse or forward directions, respectively, thereby accessing a particular letter whose information is being displayed. The user thus may select a job for transcription, as by actuating either of these pushbuttons, or at least may observe information relating to that job, as displayed on display window 70. Upon actuating pushbutton switch 50, the aforementioned pointer returns to the beginning of the next preceding untranscribed job recorded in system 10. Similarly, upon actuating pushbutton switch 50, the aforementioned pointer advances to the beginning of the next-following untranscribed job. It will be appreciated that a transcribed job may be distinguished from an untranscribed job simply by the setting or resetting of a suitable flag associated with job identification information. For example, a table of recorded jobs, both transcribed and untranscribed, may be provided; and this table may include information identifying each such job, including the aforementioned flag.

Pushbutton switches 54, 56 and 58 are adapted to erase job-related information from the aforementioned table once that job has been transcribed. This table may be characterized as a job status file, and pushbutton switch 58 may function as an "erase" switch. When switch 58 is actuated concurrently with pushbutton switch 54, job-related information associated with the job which has just been transcribed is erased from the status file. If ERASE button 58 is actuated concurrently with pushbutton switch 56, job-related information associated with all jobs which had been transcribed are erased from the status file. It is appreciated that, in the preferred embodiment wherein audio information is recorded in digital form, the erasure of job-related information from the status file is tantamount to erasing the digital audio signals from the system. Thus, one or more jobs may be erased practically instantly upon actuation of pushbutton switches 54, 56 and 58.

Pushbutton switch 44 is adapted, when actuated, to initiate a re-record operation. It is appreciated that, to transfer audio signals which had been recorded in system 10 to another medium externally of that system, switch 28 should be located at its aforementioned re-record position. Assuming this positioning of switch 28, the actuation of pushbutton switch 44 commences the re-record operation.

System 10 also is provided with visual indicators 60–68 which, for example, may be formed as LED devices. Indicator 60 is adapted to provide an indication when approximately 90% of the recording capacity of system 10 has been consumed. Indicator 60 thus is analogous to a conventional "end zone" indication normally provided in conventional analog dictation equipment. It is appreciated that the recording capacity of system 10 increases as jobs are erased therefrom.

Indicator 62 is adapted to provide a suitable indication in the event of any abnormal condition which may be sensed. For example, if the recording capacity of system 10 has been reached or if a malfunction occurs, indicator 62 is actuated. Also, it is contemplated that this indicator is energized to apprise an operator that system 10 has been placed in its "off-line" mode, as by operating switch 28 to its aforementioned off-line position.

Indicators 64 and 66 are adapted to provide indications when the aforementioned dictate ports have been seized to permit a dictate operation. Similarly, indicator 68 is adapted to provide an indication that the transcribe port has been seized. Stated otherwise, indicators 64–68 provide so-called "in use" indications of the respective dictate and transcribe ports.

PAUSE REMOVAL FROM AUDIO SIGNALS BEING RECORDED

Figure 2:
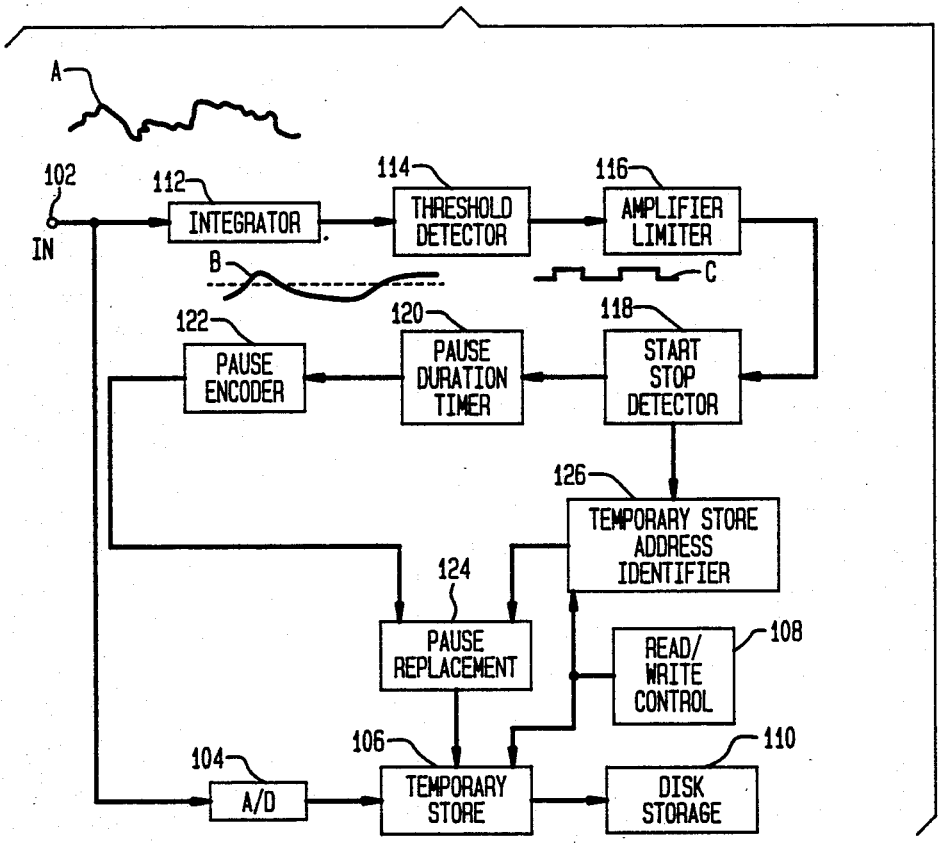
FIG. 2 is a block diagram of audio compression apparatus for removing pauses from an input audio signal.

In the preferred embodiment of system 10, input analog audio information is converted to digital form, the digitized audio signals are processed and then recorded. Preferably, the record medium is a digital record medium, whereby the audio signals are recorded in digital form. Alternatively, the processed, digitized audio signals may be reconverted to analog form and then recorded on a conventional analog medium. In either recording technique, the processing of the audio signals includes the replacement of pauses, as between syllables, words, phrases and thoughts, with encoded representations of those pauses, thereby compressing the audio information. FIG. 2 is a block diagram of one embodiment of pause replacement apparatus.

The pause replacement apparatus includes a pause detector, a pause encoder and a pause replacer. The pause detector is comprised of an integrator 112, a threshold detector 114 and an amplifier limiter 116 and typically is implemented in hardware such as conventional circuit components. Integrator 112 is coupled to an input terminal 102 to receive an input analog audio signal, such as the signal represented by waveform A in FIG. 2. This audio signal is integrated to remove rapidly changing components therefrom, resulting in the integrated waveform B, also shown in FIG. 2.

Threshold detector 114 is coupled to integrator 112 and is adapted to detect when the integrated audio signal exceeds a predetermined threshold level. It will be appreciated that silence, or pauses, are represented by relatively low analog signal levels. A relatively low threshold level is selected against which the integrated audio signal is compared. It is assumed that, when the integrated audio signal level falls below this selected threshold level, a pause is present. Conversely, intelligible speech signals are assumed to be present when the integrated audio signal level exceeds this threshold level. As a result, threshold detector 114 produces a waveform of the type shown as waveform C in FIG. 2. This waveform is supplied to amplifier limiter 116 which is adapted to produce a rectangular waveform having positive portions representative of actual speech information and negative portions representative of silence, or pauses.

The pause encoder preferably is implemented in software, such as a suitably programmed microprocessor, and is comprised of start/stop detector 118, pause duration timer 120 and encoder 122. Start/stop detector 118 is coupled to amplifier limiter 116 and is adapted to detect the beginning and end of each pause interval. If the amplifier limiter provides a signal whose waveform is of the type shown in FIG. C, start/stop detector 118 is adapted to detect the negative and positive transitions which represent the beginning and end, respectively, of each relatively negative portion of the waveform.

Pause duration timer 120 is adapted to measure the time duration between each beginning and end portion of a pause as detected by start/stop detector 118. The pause duration timer may include a suitable clock or, preferably, may be provided with clock signals derived from a system clock. In one embodiment, the clock signals are counted, and the counting operation begins when the negative transition sensed by start/stop detector 118 is detected and ends when the positive transition is detected. The resultant count represents the time duration of the detected pause. Other pulse duration measuring techniques may be used, and some are described below.

Encoder 122 is coupled to pause duration timer 120 and is adapted to provide an encoded representation of the measured pause duration. In a preferred embodiment, encoder 122 generates a pause byte (or bytes) representing the existence and duration of a pause. In an alternate embodiment, the encoded representation may represent the location of that segment of the input audio signal which had been constituted by a pause.

The pause replacer preferably is implemented in software and includes an addressable temporary storage device or buffer 106, a replacement controller 124, a temporary store address identifier 126 and a read/write controller 108. Temporary store 106 is adapted to store digitized audio samples derived from the input audio signal. In this regard, an analog-to-digital converter (ADC) 104 is coupled to input terminal 102 and is adapted to produce and digitize successive samples of the input audio signal. As an example, ADC 104 may operate at an 8 kHz sampling rate. Temporary store 106 is adapted to store these digitized audio samples under the control of read/write controller 108. Read/write controller 108 functions to generate write addresses and is coupled to temporary store address identifier 126, the latter serving to store the write addresses produced by the read/write controller after start/stop detector 118 detects the beginning of a pause. Thus, the successive addresses in temporary store 106 in which digitized samples of a pause interval are to be stored are identified.

It will be appreciated that, in the absence of replacement controller 124, temporary store 106 stores the -digitized audio samples and would also store digitized samples of pauses included in the input audio signal. Such digitized pause samples are redundant and, in accordance with the present invention, are deleted from the temporary store.

Start/stop detector 118 is coupled to and enables temporary store address identifier 126 in response to the detection of the beginning of a pause. The temporary store address identifier is disabled when start/stop detector 118 detects the end of a pause interval. At that time, replacement controller 124, which is coupled to temporary store address identifier 126, is provided with all of the addresses of temporary store 106 in which the digitized pause samples are stored.

Replacement controller 124 also is coupled to pause encoder 122 and, thus, is provided with the pause byte(s) produced by the pause encoder. In one embodiment, the replacement controller shifts the contents of temporary store 106 such that the first address in which the first digital pause sample is stored now is loaded with the aforementioned pause byte(s). The remaining digital pause samples are deleted from those addresses identified by temporary store address identifier 126; and the digital audio samples which are stored in addresses that follow the digital pause samples are simply shifted into those "cleared" addresses. Thus, temporary store 106 now stores only the digital audio samples representing intelligible information, plus the aforementioned pause bytes. If desired, the pause byte(s) may include so-called address markers which represent the address previously occupied by the first digital pause sample and the address occupied by the last digital pause sample of the deleted pause interval. That is, the start and stop addresses identified by temporary store address identifier 126 may be included in the pause byte.

Alternatively, temporary store 106 may comprise a buffer for storing audio and pause samples and a memory device into which only the audio samples and pause byte(s) are loaded, thereby deleting the digital pause samples from the information transferred to the memory. The effect is the same as the aforedescribed shifting of information in the temporary store.

Temporary store 106 (or the memory device included therein) is coupled to a disk storage device 110 and is adapted to transfer the contents of the temporary store to disk storage when, for example, a predetermined portion of the capacity of the temporary store has been filled. The reading of the contents of temporary store 106 to disk storage device 110 is controlled by read-/write controller 108 which generates successive read addresses. The manner in which this data transfer operation is carried out is known to those of ordinary skill in the microcomputer art. Hence, further description thereof need not be provided herein.

In yet another alternative embodiment, there is no need to delete from temporary store 106 the digital pause samples, as mentioned above. Rather, a pause sample deletion may be effected simply by reading from temporary store 106 the stored digital audio samples as well as the pause byte(s) loaded therein by replacement controller 124. But, those addresses in which the pause samples are stored, that is, those addresses identified by temporary store address identifier 126, need not be read from the temporary store and, thus, the digital pause samples stored in such addresses need not be transferred to disk storage device 110. In this alternative embodiment, the digital audio samples and the pause byte(s) representing the location and duration of the detected pause are recorded on disk storage.

Thus, in any of the aforedescribed embodiments, it is appreciated that the audio signals are recorded in compressed form. In these embodiments, original pauses are deleted from the audio signal and digital audio samples having pause bytes substituted for actual pauses are recorded.

PAUSE REINSERTION DURING PLAYBACK

Figure 3:
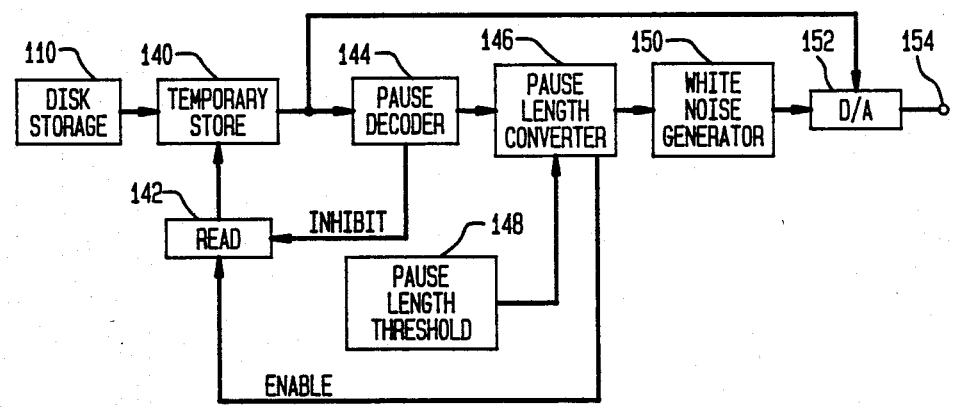
FIG. 3 is a block diagram of audio expansion apparatus for reinserting pauses into compressed audio signals.

FIG. 3 is a block diagram of playback apparatus for reproducing and expanding the audio signals recorded on disk storage device 110, such that pauses are reinserted into the reproduced audio information. It is assumed that digital signals are reproduced from disk storage, although this digital record medium may be replaced by an analog record medium from which analog signals are reproduced and then digitized. In either embodiment, the pause reinserter described herein functions to expand the reproduced audio signals to reinsert those pauses which had been deleted therefrom.

The pause reinserter preferably is implemented in software and is comprised of a temporary store 140, a pause decoder 144, and a pause length converter 146 whose output is coupled to a digital-to-analog converter (DAC) 152. Temporary store 140 is coupled to disk storage device 110 and is adapted to receive successive digital audio samples, including the aforementioned pause byte(s) reproduced from disk storage. A suitable write controller (not shown) is coupled to the temporary store and is supplied with a system clock to transfer each digital audio sample and each pause byte to a respective address of the temporary store.

Temporary store 140 is coupled to DAC 152 and is adapted to supply successive digital audio samples thereto which are read from the temporary store. A read controller 142 is coupled to the temporary store and is adapted to supply read addresses, whereupon the contents of those addresses of the temporary store (preferably successive addresses) are supplied to DAC 152. It is appreciated that DAC 152 functions to convert each digital audio sample to an analog level; and a continuous analog audio signal is supplied to output terminal 154. Although not shown, a suitable transducer, such as a loudspeaker or headset, is coupled to output terminal 154 to convert the analog audio signals supplied thereto to intelligible sound.

Temporary store 140 also is coupled to pause decoder 144 which detects and decodes the pause byte read from the temporary store. The pause decoder is coupled to read circuit 142 and is adapted to supply an inhibit signal thereto to prevent further reading of the contents of the temporary store until an enable signal is applied from pulse length converter 146.

Pause decoder 144 is coupled to pause length converter 146 which is adapted to convert the decoded pause length to successive pause samples having an overall duration derived from the decoded pause length. It is recalled that the pause length is a time duration measurement, as produced by pause duration timer 120 (FIG. 2). The pause length also may be derived from the start and stop address markers produced by temporary store address identifier 126. In either embodiment, a suitable indication of the original pause duration is supplied to pause length converter 146 by pause decoder 144.

A pause length threshold circuit 148 is coupled to pause length converter 146 and is adapted to supply to the converter a selectable threshold value. The purpose of selecting a threshold value is to permit a selected pause length not necessarily equal to the original pause length to be reinserted into the recovered audio signals. For example, it may be known that the speech pattern of one (or most) dictators includes pauses whose lengths are excessive for the purpose of intelligible transcription. Thus, rather than reinserting such excessive pause lengths, the combination of pause length converter 146 and pause length threshold 148 permits the reinserted pause length to be less than the original. Conversely, if the aforementioned speech pattern includes pause lengths which are too brief for intelligible understanding or transcription, the combination of the pause length converter and pause length threshold permits the reinsertion of pause lengths which are greater than the originals. Accordingly, if the decoded pause length supplied to pause length converter 146 by pause decoder 144 is greater than the pause length threshold selected by pause length threshold 148, the pause length converter generates pause samples having an overall duration equal to the pause length threshold duration. Conversely, if the decoded pause length is less than the pause length threshold, pause length converter 146 generates pause samples which are, nevertheless, equal in overall duration to the selected pause length threshold duration. Thus, regardless of the actual pause length originally provided in the input audio signals, during a playback operation that pause length is stretched or compressed, depending upon its comparison to the pause length threshold.

In a preferred embodiment, pause length converter 146 is adapted to convert a decoded pause length to a pause duration no less than a minimum, desired duration. If the original pause length, as represented by the pause byte, is less than this minimum desired pause duration, then pause length converter 146 merely generates pause samples having an overall duration equal to the original pause duration, as represented by the decoded pause byte. But, if the actual pause length, as represented by the pause byte, is greater than the minimum desired pause duration, then pause length converter 146 operates to generate pause samples of an overall duration that is at least equal to the desired pause duration. Thus, if the pause length threshold selected by pause length threshold 148 is less than the minimum desired pause duration, the pause length converter functions to generate pause samples having an overall duration equal to the greater of the minimum desired pause length or the threshold pause length which, in the present discussion, is the former.

Pause length converter 146 may be thought of as having two threshold circuits: one to determine if the original pause length is less than the minimum desired pause duration and, if so, to convert the original pause length to be equal to the minimum desired pause duration; and the other being operative to compare the original pause length to the threshold pause length, only if the orignal pause length exceeds the minimum desired pause duration. The threshold pause length preferably is selected by the transcriptionist or by a supervisory operator. Suitable manual controls (not shown) are provided for this purpose.

The output of pause length converter 146 is coupled to DAC 152 via a white noise generator 150. It is recognized that, when utilizing digital signal processing techniques for recording audio information, extremely high fidelity is attained. Consequently, when inserting and, thus, emulating pauses in the reproduced audio signals, such pauses will be extremely silent. Indeed, contrary to conventional analog dictate/transcribe systems, the use of digital techniques is not accompanied by hiss, background or other tape noise normally found in analog systems. As a consequence, upon detecting silent pause intervals, the transcriptionist may erroneously believe that a malfunction is present in the system. Accordingly, to provide some form of "comfort" to skilled operators having experience in analog transcribe equipment, white noise generator 150 is used to substitute random or white noise, comparable to background noise, for the silent pause intervals when audio information is reproduced.

Preferably, white noise generator 150 is a conventional digital device which, in response to information representing the duration of a pause, as supplied thereto by pause length converter 146, generates digital samples representing random noise signals. These digital noise samples are supplied to DAC 152 for conversion to corresponding analog noise signals. It is these analog noise signals which are transduced, or converted into audible sounds by suitable transducers coupled to output terminal 154.

In an alternative embodiment, white noise generator 150 may be an analog device whose output is coupled to output terminal 154 for supplying analog random noise signals over the reinserted pause length determined by pause length converter 146. In any event, it is preferred that random noise, in analog form, is supplied to the audio transducer coupled to the output of DAC converter 152 during reinserted pause intervals to minimize the erroneous perception that system 10 has malfunctioned.

MICROPROCESSOR IMPLEMENTATION OF PAUSE ENCODING

Figure 4:
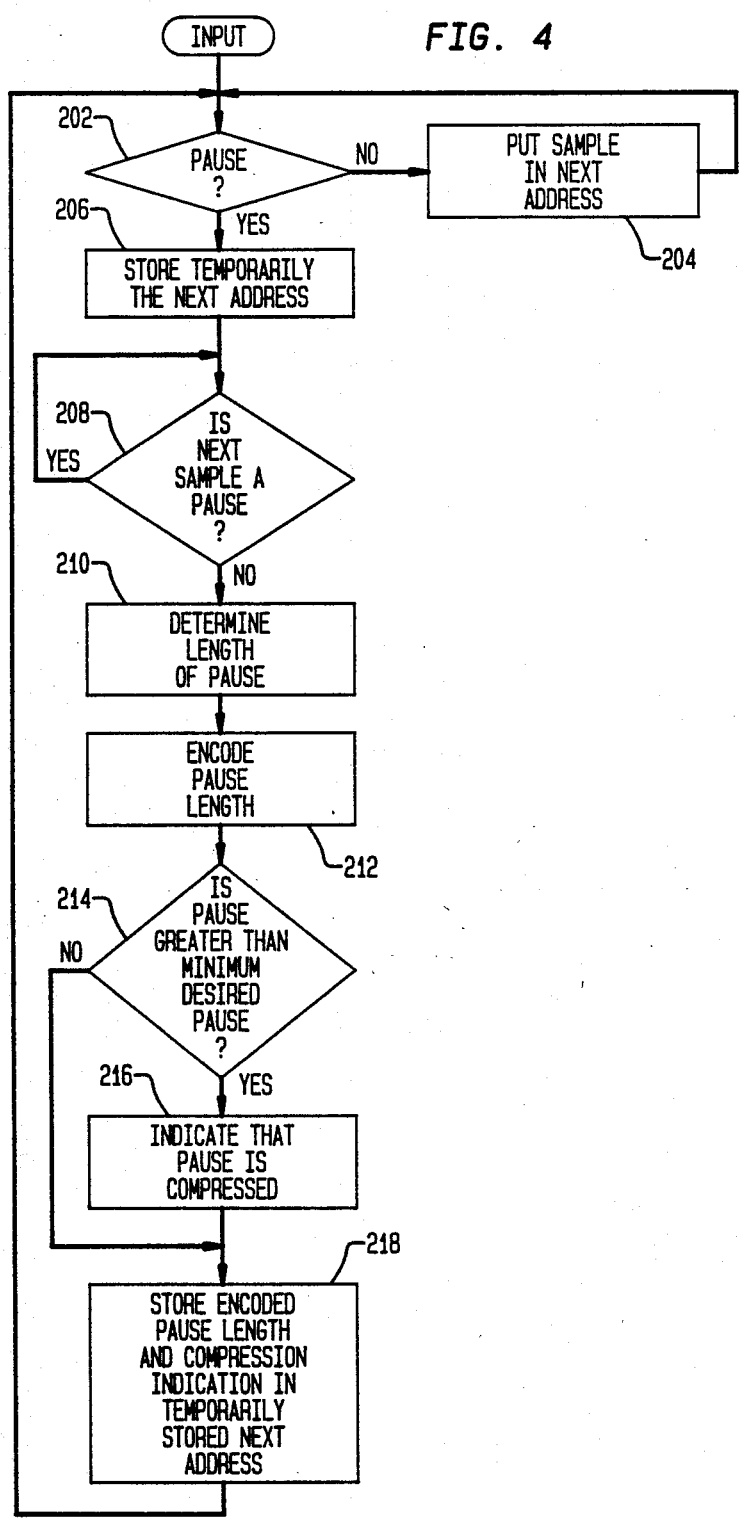
FIG. 4 is a flow chart of microprocessor software used to compress audio signals.

Referring to FIG. 4, there is illustrated a flow chart representing the manner in which a microprocessor, such as NEC Model MPD 70208 operates to produce a digital pause encoded signal in response to, for example, an output representing the presence of a pause, such as may be produced by start/stop detector 118 (FIG. 2). For the purpose of discussing the flow chart shown in FIG. 4, it is assumed that a digital signal is supplied ti the illustrated input which is either an audio sample or a pause sample. Inquiry 202 first is made to determine if this digital signal is a pause sample (or is otherwise indicative of a pause). If not, the illustrated microprocessor routine advances to instruction 204 and this signal, assumed to be a digital audio sample, is written into the next available address of temporary store 106 (FIG. 2). Thus, as successive write addresses are generated by read/write controller 108, input digital audio samples, as recognized by inquiry 202, are stored in those addresses.

However, if inquiry 202 is answered in the affirmative, the routine advances to instruction 206 to store temporarily the write address then generated by read/write controller 108. Then, inquiry is made at 208 to determine if the next-following digital sample supplied by, for example, start/stop detector 118 is a pause sample. If so, the routine merely cycles through the loop comprised of inquiry 208 until the end of the pause interval is detected. At that time, the next-following sample is a digital audio sample and inquiry 208 then is answered in the negative.

In response to the negative answer provided by inquiry 208, the routine advances to instruction 210 to determine the length of the pause interval. In one example, the pause length is measured by counting the number of cycles made through inquiry 208, thereby measuring the number of digital pause samples that are present. It is recognized that the pause length may be calculated by multiplying the number of cycles that had been made through inquiry 208 by the cycling rate (or by the rate at which the input audio signal is sampled). In another example, the pause length is measured by counting the number of system clock pulses that are generated between the time that start/stop detector 118 (FIG. 2) detects the start of the pause interval and the time that this detector detects the end of the pause interval.

Regardless of the technique used to determine the length of the detected pause, after this length is measured, the illustrated routine advances to instruction 212 whereat the measured pause length is encoded. That is, a byte is generated representing the length of this measured pause. The resultant digital pause encoded signal (or pause byte) also may include address markers which identify the write addresses generated by read/write controller 108 at the times that start/stop detector 118 detects the beginning and end, respectively, of the detected pause. If the pause originally present in the input audio signal would be retained (which, of course, it is not), these address markers represent the addresses at which the beginning and end of the pause interval would be stored. Thus, it is appreciated that these address markers themselves, or at least the difference therebetween, provides an indication of the measured pause length. Consequently, in still another embodiment, the digital pause encoded signal (or pause byte) may include simply the aforementioned address markers; thereby distinguishing a digital pause encoded signal from a digital audio sample and, moreover, representing the length and location of the detected pause interval.

After carrying out instruction 212, the illustrated routine advances to inquiry 214 to determine if the measured pause interval is greater than a minimum desired pause interval. Preferably, this minimum desired pause length may be operator selected and is intended to enable the pause interval, when reinserted during a playback operation, to be varied in accordance with operator preference. More particularly, if the measured pause length, that is, the actual pause length, is less than the minimum desired pause length, then during audio signal reproduction and pause reinsertion (as will be described below), the measured pause length is reinserted into the reproduced audio signal. But, if the actual pause length is greater than this minimum desired length, the pause which is reinserted during signal playback may be of any preferred length selected by the transcriptionist. In this manner, pauses which are too brief to be bona fide simply are reproduced as is. However, a bona fide pause may be compressed or expanded during an audio playback operation, thereby accommodating the dictator's speech pattern to the preference of the transcriptionist.

If inquiry 214 is answered in the affirmative, the illustrated routine advances to instruction 216 to indicate that the measured pause, which is recorded simply as a digital pause encoded signal (or pause byte), is compressed. As an example, a suitable flag included in the pause encoded signal may be set or reset as a function of the answer to inquiry 214.

After indicating that the measured pause interval is compressed, as represented by instruction 216, or in the alternative, if inquiry 214 is answered in the negative, the illustrated routine advances to instruction 218 to store the encoded pause length and the compression indication, if any, in the address which had been temporarily stored by instruction 206. Then, the illustrated routine returns to inquiry 202.

To best understand the operation of the flow chart shown in FIG. 4, let it be assumed that successive samples of the input audio signal are presented as samples 1, 2, 3, ..., 50. Let it be further assumed that read/write control 108 generates write addresses 1, 2, 3, ..., 50, with each address being adapted to store a respective one of the presented samples. Finally, let it be assumed that sample 1 represents a digital audio sample, but samples 2–50 are taken during a pause interval. Thus, sample 2 is assumed to be the beginning of the pause interval and sample 50 is assumed to be the end of that interval.

With the foregoing assumption, inquiry 202 determines if sample 1 is a pause sample. This inquiry is answered in the negative and, therefore, sample 1 is stored in address 1, as represented by instruction 204. The routine then returns to inquiry 202 which next inquires if sample 2 is a pause sample.

In accordance with the assumption discussed herein, sample 2 is a pause sample and inquiry 202 is answered in the affirmative. Accordingly, address 2, next generated by read/write controller 108, is temporarily stored, as represented by instruction 206. Then, inquiry 208 is made to determine if sample 3 is a pause sample; and in accordance with the assumption discussed herein, inquiry 208 is answered in the affirmative for samples 3–50. When pause sample 50 is present, the next sample 51 is assumed to be an audio sample. Hence, inquiry 208 now is answered in the negative. Then, instruction 210 determines the length of the pause; and it is recognized that, in accordance with the assumption discussed herein, the determined pause length is equal to the time interval between samples 2 and 50 (or between the generation of addresses 2 and 50). This pause length of 49 samples is encoded by instruction 212. Included in this digital pause encoded signal is an indication of the address markers which, as assumed herein, are addresses 2 (the beginning of the pause interval) and 50 (the end of the pause interval).

Next, a determination is made, at inquiry 214, if this measured pause interval is greater than the minimum desired pause length. Let it be assumed, for the purpose of this discussion, that the minimum desired pause length is 0.5 seconds. If the measured pause length is, for example, 0.4 seconds, inquiry 214 is answered in the negative and no indication is provided in the digital pause encoded signal that the measured pause length is compressed. However, if the measured pause length is, for example, 0.6 seconds, then inquiry 214 is answered in the affirmative, instruction 216 provides the digital pause encoded signal with a compression indication, and this digital pause encoded signal is stored in address 2, the address which had been temporarily stored by instruction 206.

When next sample 51 is received, inquiry 202 is answered in the negative because it has been assumed that this sample 51 is an audio sample. Hence, sample 51 is stored in the next address generated by read/write controller 108. In one embodiment, sample 51 is stored in address 51. However, in an alternative embodiment, since addresses 3-50 have not been used to store samples, the address next generated by read/write control 108 can be reset from address 51 to address 3. In this manner, audio sample 51 may be stored in address 3. With this alternative, it is appreciated that audio sample 1 is stored in address 1, the digital pause encoded signal, which replaced samples 2-50, is stored in address 2, and audio sample 51 is stored in address 3. As a result, the temporarily stored samples of the input audio signal are compressed. These stored samples then can be read out to disk storage 110.

MICROPROCESSOR IMPLEMENTATION OF PAUSE REINSERTION

Figure 5:
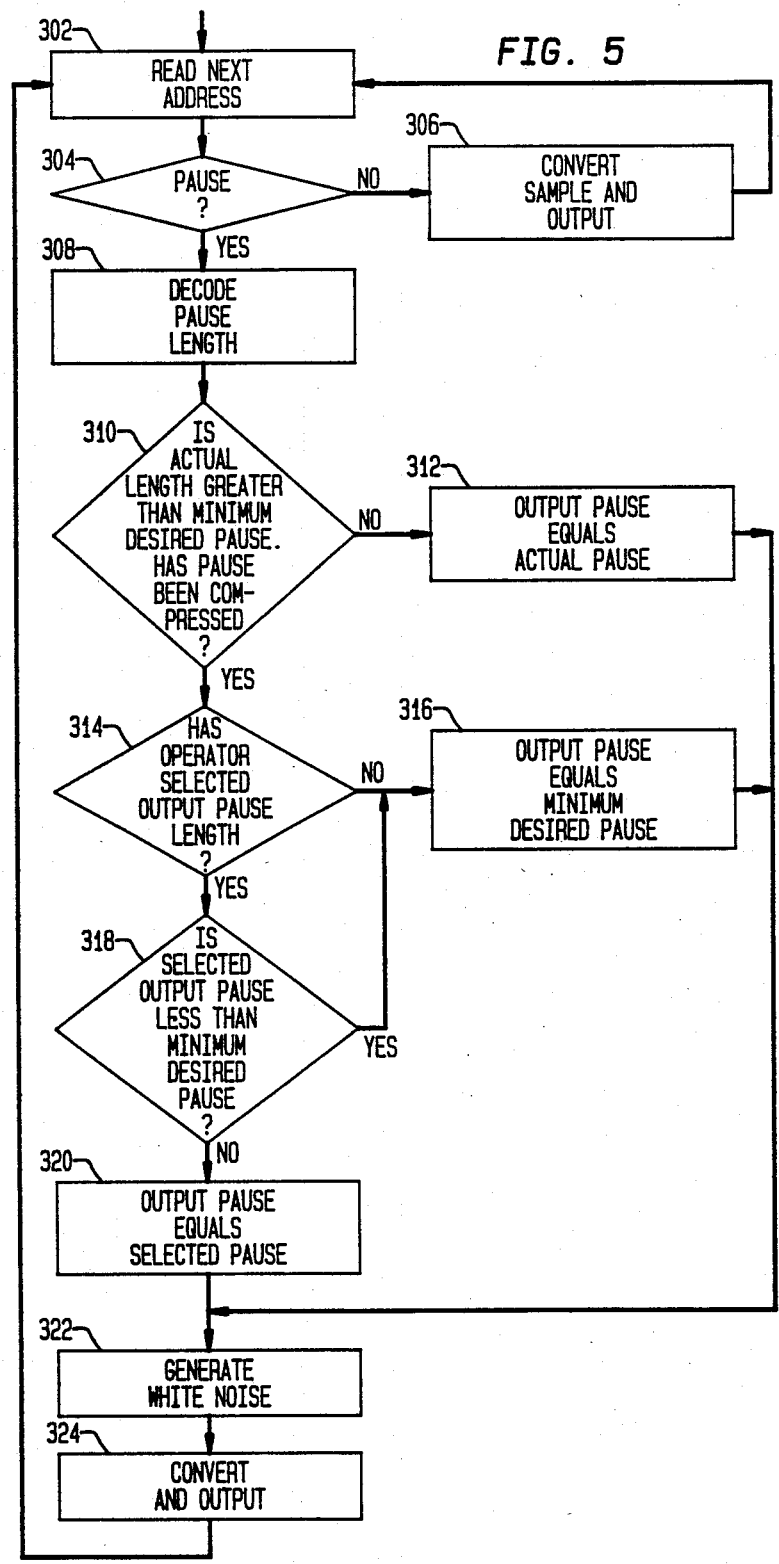
FIG. 5 is a flow chart of microprocessor software used to expand audio signals which had been compressed.

From the foregoing description, it is seen that the original input audio signal is recorded in compressed, digital format on a magnetic disk (or like recording medium). Extended pause lengths constituted by redundant information are replaced by a simple pause byte which represents the length and location of the replaced pause. During a playback operation, successive digital audio samples are reproduced from disk storage 110 and written into a temporary storage device, such as an addressable memory. A pause interval derived from the pause byte is reinserted into the reproduced audio signal to recover the original pauses. Preferably, the actual duration of the original pause interval may be replaced by an operator-selected interval, provided that the original pause interval was a bona fide pause, as mentioned above. FIG. 5 illustrates a flow chart representing the microprocessor implementation of such pause reinsertion.

In carrying out the illustrated routine, successive addresses of temporary store 140 are read, as represented by instruction 302. Upon reading the contents of this next address, inquiry 304 is made to determine if an audio sample or a pause byte is stored in that address. If inquiry 304 is answered in the negative, it is assumed that a digital audio sample is read from this address; and instruction 306 is carried out to convert this digital audio sample to analog form and to output this analog signal to a loudspeaker, headset or other conventional transducer. Then, instruction 302 is repeated and the content of the next address of temporary store 140 are read.

The foregoing cycle is repeated until a pause byte is read from the temporary store, as represented by an affirmative answer to inquiry 304. At this time, instruction 308 is carried out to decode the pause length represented by the pause byte. Thus, the original pause length is recovered.

Inquiry 310 then is made to determine if the original, or actual, pause length is greater than the minimum desired pause length. That is, inquiry is made to determine if the digital pause encoded signal represents a compressed pause interval. If inquiry 310 is answered in the negative, that is, if the original, actual pause length was less than the minimum desired pause length, the illustrated routine advances to instruction 312 to produce an output pause interval substantially equal to the original, actual pause interval. For example, and consistent with the numerical example discussed above, if the minimum desired pause length is 0.5 seconds but the actual, original pause length is 0.4 seconds, as represented by the pause byte, inquiry 310 is answered in the negative. Instruction 312 then produces an output representing a 0.4 second pause length. For instance, a number of digital pause samples may be produced corresponding to an interval of 0.4 seconds. If the input audio signal is sampled at the rate of 8 kHz, then instruction 312 may provide 3200 pause samples to represent a pause interval of 0.4 seconds. These pause samples are encoded as white noise (or random noise) samples, as represented by instruction 322. Such white noise samples thereafter are converted to analog form, as represented by instruction 324, and supplied to the transducer coupled to output 154 of FIG. 3.

If inquiry 310 is answered in the affirmative, that is, if an indication is provided in the digital pause encoded signal that the pause length may be compressed, the routine advances to inquire, at 314, if the transcriptionist (or other supervisory operator) has selected a preferred pause length duration for reinsertion into the recovered audio signals. If this inquiry is answered in the negative, that is, if the transcriptionist or supervisory operator has not selected a preferred reinserted pause length, the routine advances to instruction 316. As indicated, instruction 316 produces a number of pause samples which constitute a pause interval equal to the minimum desired pause length. Thus, if the minimum desired pause length is equal to 0.5 seconds, consistent with the numerical example discussed above, then instruction 316 produces a number of output pause samples which, when converted to analog form, results in a pause length of 0.5 seconds. Continuing with the previously discussed numerical example wherein the original input audio signal is sampled at an 8 kHz rate, instruction 316 produces approximately 4000 digital pause samples to represent a pause interval of 0.5 seconds. These pause samples are encoded to represent random noise samples, as indicated by instruction 322, and such random noise samples are converted to analog form, as represented by instruction 324.

If inquiries 310 and 314 both are answered in the affirmative, thus indicating that the actual pause length which was included in the original analog audio signal was greater than the minimum desired pause length (assumed herein to be 0.5 seconds), and further indicating that the transcriptionist or supervisory operator has selected a preferred pause length to be reinserted into the recovered audio signals, the routine advances to inquiry 318. This inquiry determines whether the selected preferred pause length is less than the minimum desired pause length. Consistent with the example described herein, inquiry 318 is made to determine if the selected preferred pause length is less than 0.5 seconds. If so, instruction 316 is carried out. However, if inquiry 318 is answered in the negative, that is, if the selected preferred pause length exceeds the minimum desired pause length (i.e. if the selected preferred pause length is greater than 0.5 seconds), then instruction 320 is carried out. This instruction provides a number of digital pause samples resulting in a pause length equal to the preferred pause length which has been selected by the transcriptionist or supervisory operator. These pause samples are encoded as random noise samples, as indicated by instruction 322, and the random noise samples are converted to analog form, as represented by instruction 324.

After the output pause length has been generated in response to the digital pause encoded signal (or pause byte), as represented by instructions 312, 316 or 320, and after the generated pause length has been represented as random or white noise, as represented by instructions 322 and 324, the routine returns to instruction 302 to read the contents of the next address of temporary store 140. Then, the illustrated routine is repeated, depending upon whether the content of the next-read address is a digital audio sample or a digital pause encoded signal.

In accordance with the pause reinsertion routine discussed above, it is appreciated that the reading of addresses from temporary store 140 is inhibited when a digital pause encoded signal is read therefrom. This interruption in the reading out of the contents of the temporary store continues for the duration needed to generate a pause interval, whether that pause interval is equal to the original encoded interval, as represented by instruction 312, or is equal to the minimum desired interval, as represented by instruction 316, or is equal to the interval selected by the transcriptionist or supervisory operator, as represented by instruction 320. Once this pause interval has been generated and reinserted into the reproduced audio signals, the reading out of temporary store 140 resumes. For example, if the transcriptionist or supervisory operator selects a preferred output pause length of 0.6 seconds, and if the minimum desired pause length is 0.5 seconds, then a pause interval equal to 0.6 seconds is generated and reinserted into the reproduced audio signals whenever the digital pause encoded signal represents an original pause length greater than 0.5 seconds. Should the digital pause encoded signal represent a pause length of 0.4 seconds, the generated and reinserted pause length will be equal to the actual, original 0.4 second pause length. However, if the transcriptionist or supervisory operator has not selected a preferred output pause length, then, even if the actual pause length represented by the digital pause encoded signal is greater than the minimum desired pause length, the pause length which is generated and reinserted into the reproduced audio signals will be equal to that minimum desired length.

While the present invention has been particulary shown and described with reference to preferred embodiments, it will be readily appreciated by those of ordinary skill in the art that various changes and modifications may be made without departing from the spirit and scope of the invention. For example, discrete circuitry may be used to implement the functions which have been described above as being carried out by software. Several other changes and modifications have been discussed above. It is, therefore, intended that the appended claims be interpreted as including the embodiments described herein, those changes and modifications which have been discussed previously, as well as all equivalents thereto.

What is claimed is:

1. Sound recording apparatus comprising: an input including analog-to-digital converter (ADC) means for receiving analog audio signals, converting the received audio signals to digitized audio signals and producing digital samples of the received audio signals; pause detecting means coupled to said input for detecting respective pauses in the received audio signals; pause encoding means for encoding the length of each detected pause and for producing a digital pause encoded signal representing said length; replacement means for replacing respective pauses in the digitized audio signals with the digital pause encoded signal therefor; digital recording means for recording the pause-replaced digitized audio signals; and temporary store means having addressable locations for storing said digital samples, and address generating means for generating addresses to identify the respective locations in which said digital samples are stored, whereby audio signals are recorded without original pauses and are compressed.

2. The apparatus of claim 1 wherein said pause encoding means includes threshold means providing a threshold value representing a minimum desired pause length; comparison means for comparing the length of a pause in the received audio signals to said threshold value to determine if said pause exceeds said minimum desired pause length; and means for including in said digital pause encoded signal an indication of whether said pause is less than or greater than said minimum desired pause length.

3. The apparatus of claim 2 wherein said threshold value is selectable.

4. The apparatus of claim 3 wherein said pause encoding means further includes address sensing means for sensing the address of said temporary store means at which the beginning of a detected pause would be stored and for sensing the address of said temporary store means at which the end of a detected pause would be stored; and means for providing address markers in said digital pause encoded signal representing said sensed addresses.

5. The apparatus of claim 4 further comprising write means for writing into said temporary store said digital pause encoded signals produced by said pause encoding means, thereby eliminating stored digital samples of pauses and compressing the digital information recorded by said recording means.

6. The apparatus of claim 5 wherein said digital recording means includes rigid disk storage means coupled to said temporary store means for recording said digital samples of received audio signals and said digital pause encoded signals.

7. Sound reproducing apparatus comprising: a storage medium on which are recorded compressed digital audio signals including digital samples of audio information and digital pause encoded signals representing the lengths of respective pauses included in original audio signals that had been recorded; playback means for playing back the digital samples and digital pause encoded signals; digital-to-analog converting (DAC) means for converting the played back digital samples to analog audio signals; insertion means responsive to a played back digital pause encoded signal for inserting into said analog audio signals a pause whose length is derived from said digital pause encoded signal; and transducer means for producing audio sounds in response to said analog audio signals; said insertion means comprising pause length setting means for setting the length of an inserted pause (a) to be equal to a predetermined amount if the length represented by the digital pause encoded signal exceeds a minimum desired length and (b) to be equal to the length represented by the digital pause encoded signal if said last-mentioned length is less than said minimum desired length.

8. The apparatus of claim 7 wherein said pause length setting means comprises selector means for selecting said predetermined amount within a preset range of pause lengths no less than said minimum desired length.

9. The apparatus of claim 8 wherein said pause length setting means further comprises means for determining if the selected predetermined amount is less than said minimum desired length; and means for setting the length of said inserted pause equal to said minimum desired length if the length represented by the digital pause encoded signal is greater than said minimum desired length and the selected predetermined amount is less than said minimum desired length.

10. The apparatus of claim 9 wherein said pause length setting means additionally includes means for determining if said selected predetermined amount exceeds said minimum desired length to set the length of said inserted pause equal to said selected predetermined amount.

11. The apparatus of claim 7 further comprising temporary storage means for storing the played back digital samples and ditial pause encoded signals; read out means for reading out to said DAC means the digital samples stored in said temporary storage means; inhibit means for inhibiting the reading out of said temporary storage means in response to a digital pause encoded signal; and means for supplying to said DAC means the pause whose length is set by said pause length setting means.

12. The apparatus of claim 11 wherein said inhibit means comprises detecting means for detecting a digital pause encoded signal read out from said temporary storage means, and pause sample means for generating digital pause representing samples for a time period determined by the pause length set by said pause length setting means; and wherein the means for supplying to said DAC means the pause whose length is set by said pause length setting means comprises means for supplying the digital pause samples to said DAC means.

13. The apparatus of claim 12 wherein said means for supplying the digital pause samples to said DAC means comprises random noise generating means for converting the digital pause samples to random noise samples; and means for supplying the random noise samples to said DAC means.

14. The apparatus of claim 11 further comprising means for resuming the reading out of said temporary storage after a time duration determined by the pause whose length is set by said pause length setting means.

15. Sound recording and reproducing apparatus comprising:
an input for receiving audio signals to be recorded;
pause detecting means coupled to said input for detecting respective pauses in the received audio signals;
pause encoding means for producing a digital pause encoded signal representing a pause length for each detected pause;
analog-to-digital converting (ADC) means coupled to said input for converting the received audio signals to digital audio samples representative thereof;
temporary store means coupled to said ADC means and having addressable locations for storing said digital audio samples and address generating means for generating addresses to identify the respective locations in which said digital audio samples are stored;
replacement means for replacing pauses in the received audio signals with respective digital pause encoded signals;
recording means for recording the digital audio samples and digital pause encoded signals, whereby the recorded audio signals are compressed;
playback means for playing back the recorded digital audio samples and digital pause encoded signals;
digital-to-analog converting (DAC) means coupled to said playback menas for converting the played back digital audio samples to analog audio signals;
insertion means responsive to a played back digital pause encoded signal for inserting into the converted analog audio signal a pause whose length is derived from said digital pause encoded signal; and
output means for outputting analog audio signals with inserting pauses.

16. The apparatus of claim 15 wherein said pause encoding means includes threshold means providing a threshold value representing a minimum desired pause length; comparison means for comparing the length of a pause in the received audio signals to said threshold value to determine if said pause exceeds said minimum desired pause length; and means for including in said digital pause encoded signal and indication of whether said pause is less than or greater than said minimum desired pause length.

17. The apparatus of claim 16 wherein said pause encoding means further includes address sensing means for sensing the address of said temporary store means at which the beginning of a detected pause would be stored and for sensing the address of said temporary store means at which the end of a detected pause would be stored; and means for providing address markers in said digital pause encoded signal representing said sensed addresses.

18. The apparatus of claim 17 further comprising write means for writing into said temporary store said digital pause encoded signals produced by said pause encoding means, thereby eliminating stored digital samples of pauses and compressing the digital information recorded by said recording means.

19. The apparatus of claim 18 wherein said recording means includes rigid disk storage means coupled to said temporary store means for recording said digital audio samples and said digital pause encoded signals.

20. The apparatus of claim 15 wherein said insertion means includes random noise generating means for generating a random noise signal having a time duration substantially equal to the length of the inserted pause; and means for inserting said random noise signal into the analog audio signals.

21. The apparatus of claim 15 wherein said insertion means comprises pause length setting means for setting the length of an inserted pause (a) to be equal to a predetermined amount if the length represented by the digital pause encoded signal exceeds a minimum desired length and (b) to be equal to the length represented by the digital pause encoded signal if said last-mentioned length is less than said minimum desired length.

22. The apparatus of claim 21 wherein said pause length setting means comprises selector means for selecting said predetermined amount within a preset range of pause lengths no less than said minimum desired length.

23. The apparatus of claim 22 wherein said pause length setting means further comprises means for determining if the selected predetermined amount is less than said minimum desired length; and means for setting the length of said inserted pause equal to said minimum desired length if the length represented by the digital pause encoded signal is greater than said minimum desired length and the selected predetermined amount is less than said minimum desired length.

24. The apparatus of claim 23 wherein said pause length setting means additionally includes means for determining if said selected predetermined amount exceeds said minimum desired length to set the length of said inserted pause equal to said selected predetermined amount.

25. The apparatus of claim 21 further comprising temporary storage means for storing the played back digital audio samples and digital pause encoded signals; read out means for reading out to said DAC means the digital audio samples stored in said temporary storage means; inhibit means for inhibiting the reading out of said temporary storage means in response to a digital pause encoded signal; and means for supplying to said DAC means the pause whose length is set by said pause length setting means.

26. The apparatus of claim 25 wherein said inhibit means comprises detecting means for detecting a digital pause encoded signal read out from said temporary storage means, and pause sample means for generating digital pause representing samples for a time period determined by the pause length set by said pause length setting means; and wherein the means for supplying to said DAC means the pause whose length is set by said pause length setting means comprises means for supplying the digital pause samples to said DAC means.

27. The apparatus of claim 26 wherein said means for supplying the digital pause samples to said DAC means comprises random noise generating means for converting the digital pause samples to random noise samples; and means for supplying the random noise samples to said DAC means.

28. The apparatus of claim 25 further comprising means for resuming the reading out of said temporary storage after a time duration determined by the pause whose length is set by said pause length setting means.

29. Sound reproducing apparatus comprising: a storage medium on which are recorded compressed digital audio signals including digital samples of audio information and digital pause encoded signals representing the lengths of respective pauses included in original audio signals that had been recorded; playback means for playing back the digital samples and ditial pause encoded signals; digital-to-analog converting (DAC) means for converting the played back digital samples to analog audio signals; insertion means responsive to a played back digital pause encoded signal for inserting into said analog audio signals a pause whose length is derived from said digital pause encoded signal; and transducer means for producing audio sounds in response to said analog audio signals; said insertion means including: (a) random noise generating means for generating a random noise signal having a time duration substantially equal to the length of the inserted pause; and (b) means for inserting said random noise signal into the analog audio signals.

* * * * *